United States Patent [19]

Furrer et al.

[11] Patent Number: 5,220,983
[45] Date of Patent: Jun. 22, 1993

[54] SHOCK ABSORBER WITH HEAT EXCHANGER AND IMPROVED CYLINDER HEAD ASSEMBLY

[75] Inventors: Frederick J. Furrer, Wisconsin Dells, Wis.; Charles D. Lemme, Tucson, Ariz.

[73] Assignee: Hyrad Corporation, Wisconsin Dells, Wis.

[21] Appl. No.: 842,706

[22] Filed: Feb. 27, 1992

Related U.S. Application Data

[62] Division of Ser. No. 580,755, Sep. 11, 1990, Pat. No. 5,113,980.

[51] Int. Cl.$^5$ .............................................. F16F 9/46
[52] U.S. Cl. .................................. 188/274; 188/299; 188/322.14; 280/714
[58] Field of Search ................... 188/318, 322.14, 299, 188/315, 316, 317, 322.15, 282, 274, 322.22, 322.17; 280/714, 709; 137/487.5

[56] References Cited

U.S. PATENT DOCUMENTS

| | | |
|---|---|---|
| 1,921,025 | 8/1933 | Fox . |
| 1,929,791 | 10/1933 | Peo . |
| 1,954,196 | 4/1934 | Breer et al. . |
| 2,035,954 | 3/1936 | Focht .............................. 188/282 X |
| 2,067,281 | 1/1937 | Padgett ............................. 188/282 |
| 2,087,548 | 7/1937 | Pitt . |
| 2,718,285 | 9/1955 | Largay, Jr. . |
| 3,795,291 | 3/1974 | Naito et al. ......................... 188/274 |
| 3,945,626 | 3/1976 | Tilkens ............................ 188/274 X |
| 4,123,859 | 11/1978 | de Koning .......................... 188/282 |
| 4,616,810 | 10/1986 | Richardson et al. ............. 188/274 X |
| 4,838,394 | 6/1989 | Lemme et al. ..................... 188/318 |
| 4,880,086 | 11/1989 | Knecht et al. ..................... 188/299 |

FOREIGN PATENT DOCUMENTS

| | | | |
|---|---|---|---|
| 154382 | 8/1951 | Australia ............................. 188/282 |
| 893762 | 9/1953 | Fed. Rep. of Germany ...... 188/274 |
| 1455903 | 6/1969 | Fed. Rep. of Germany ...... 188/318 |
| 1580582 | 10/1970 | Fed. Rep. of Germany . |

OTHER PUBLICATIONS

Article "A Novel Valve for Semi-Active Vehicle Suspension Systems" by G. A. Parker, BSc, PhD, CEng, FIMechE and K. S. Lau, PhD., Department of Mechanical Engineering, U. of Surrey, Guildford.
HSC brochure-Application Case History-Precision Pressure Control.
MOOG Series 15 Pressure Control Serovalves.
Article "Active Suspension Test Drive": Riding on Electrons by Don Sherman, *Poplar Science*, Sep. 1990 pp. 74-77.
Group of Articles-SAE-"Advanced Truck Suspension".
Article "Electronic Control of Car Chasis Present Status and Future Perspective" by R. Kizu, H. Harada, H. Minabe, IEEE catalog No. 88 CH2533-8, pp. 173-187.

*Primary Examiner*—Robert J. Oberleitner
*Assistant Examiner*—Peter M. Poon
*Attorney, Agent, or Firm*—Willian Brinks Olds Hofer Gilson & Lione

[57] ABSTRACT

A monoflow shock absorber is provided with a blow off valve which provides the principal flow restriction during both extension and compression of the shock absorber. The force biasing the blow off valve closed is controlled by a control piston which is connected to the blow off valve plate by a rigid, solid rod. The piston responds to a pressurized control fluid, the pressure of which is selected by a high speed pressure regulating device such as a servo valve. This system provides high speed adjustment of the damping force of the shock absorber, substantially independently of the stroking speed of the shock absorber. The shock absorber includes a cylinder in which a working piston moves, and the cylinder is closed at one end with an inner cylinder head assembly made up of a body and a cap, which define a manifold therebetween. An external heat exchanger is coupled to the base of the shock absorber to receive working hydraulic fluid which is passed through the blow off valve, and to return the working hydraulic fluid to the shock absorber after passage through the heat exchanger.

8 Claims, 6 Drawing Sheets

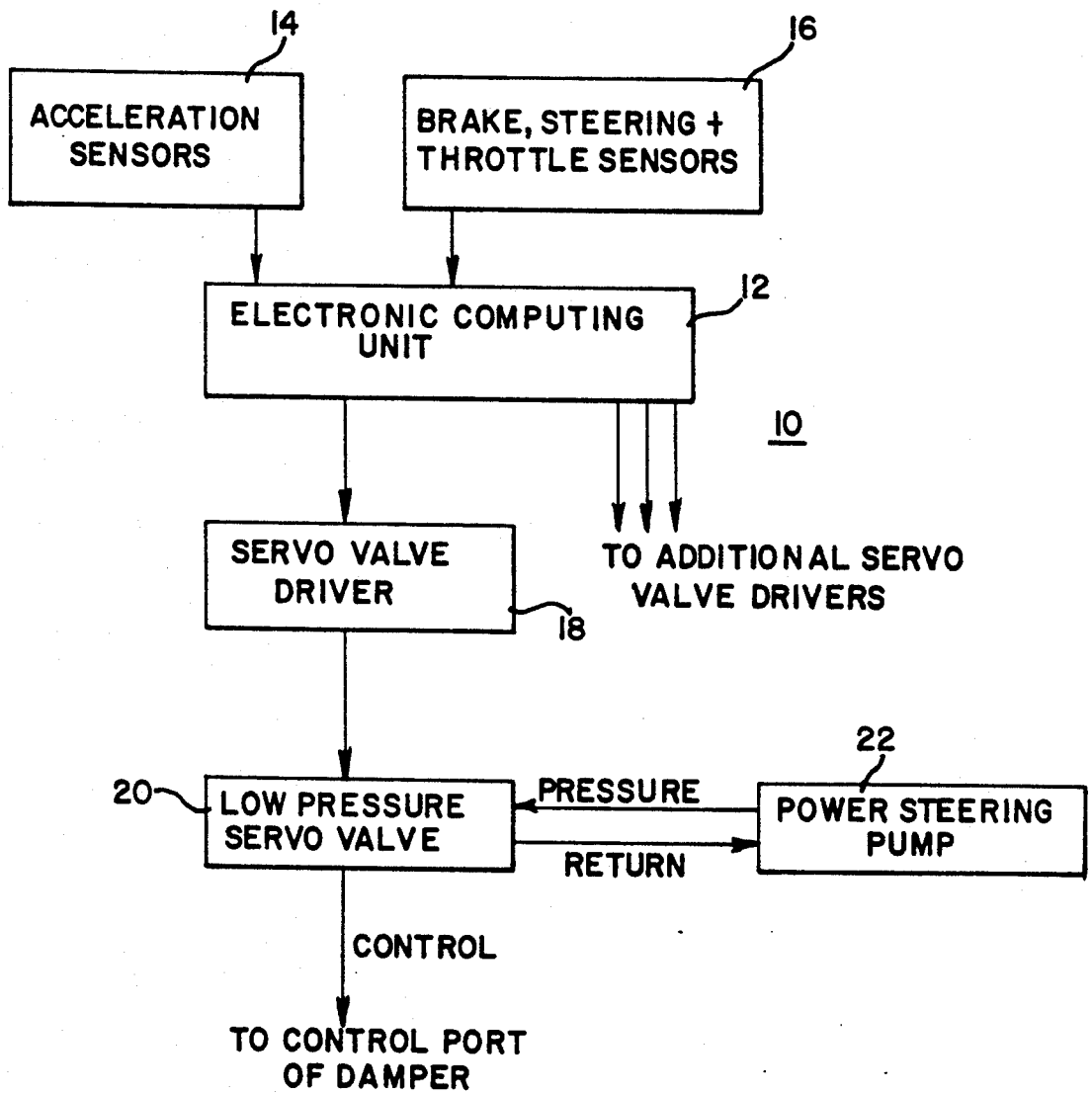

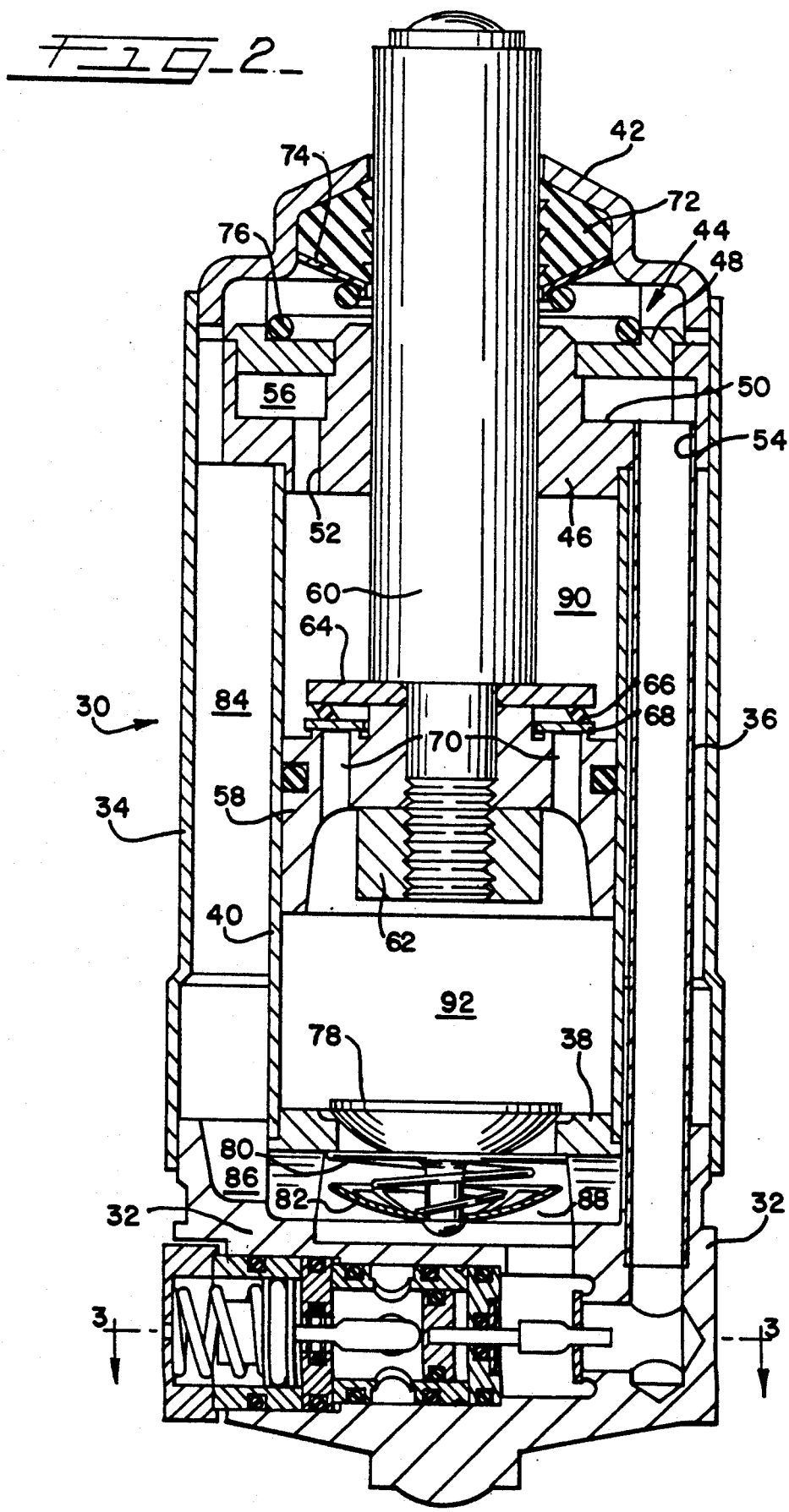

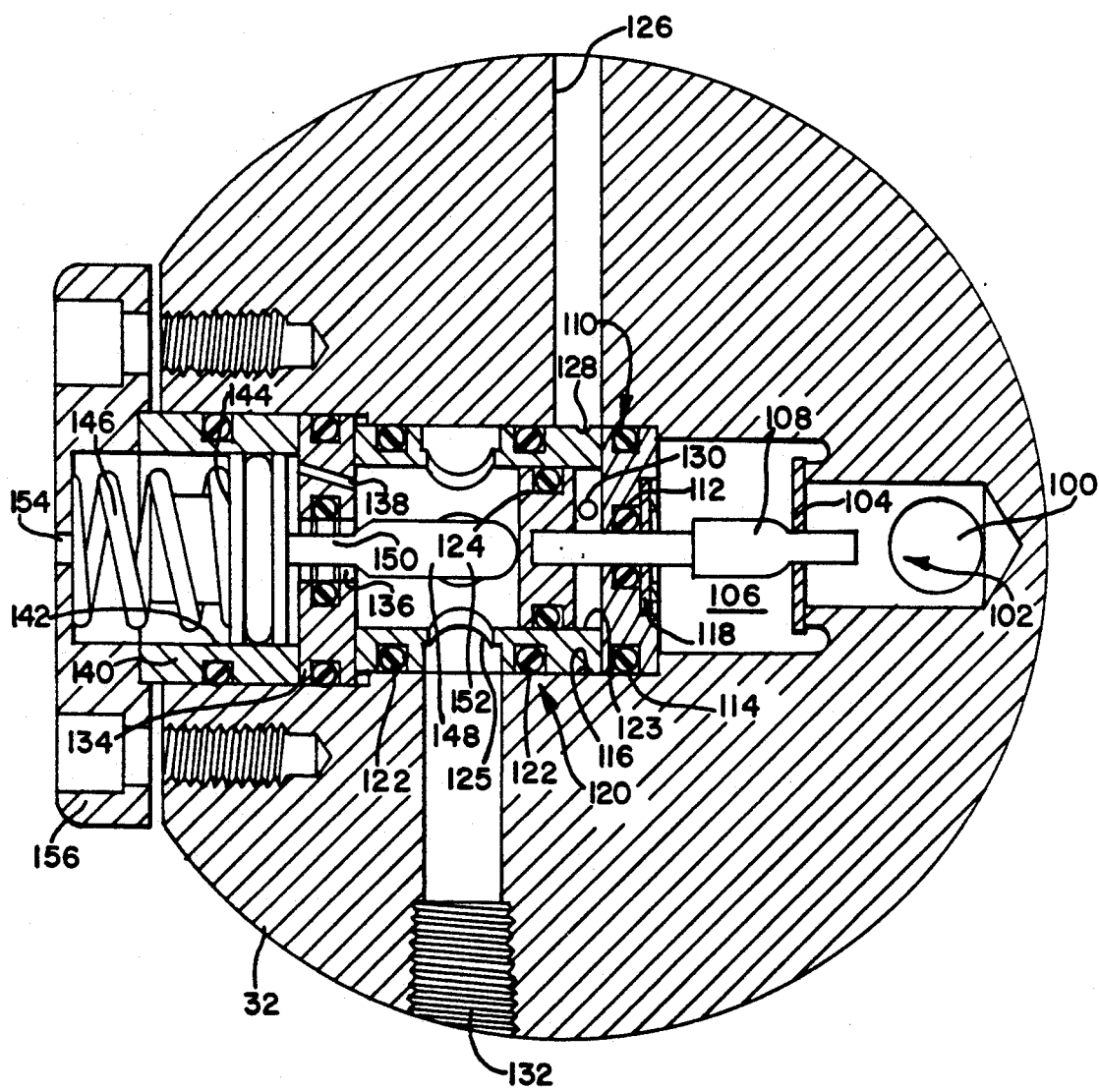
FIG_3

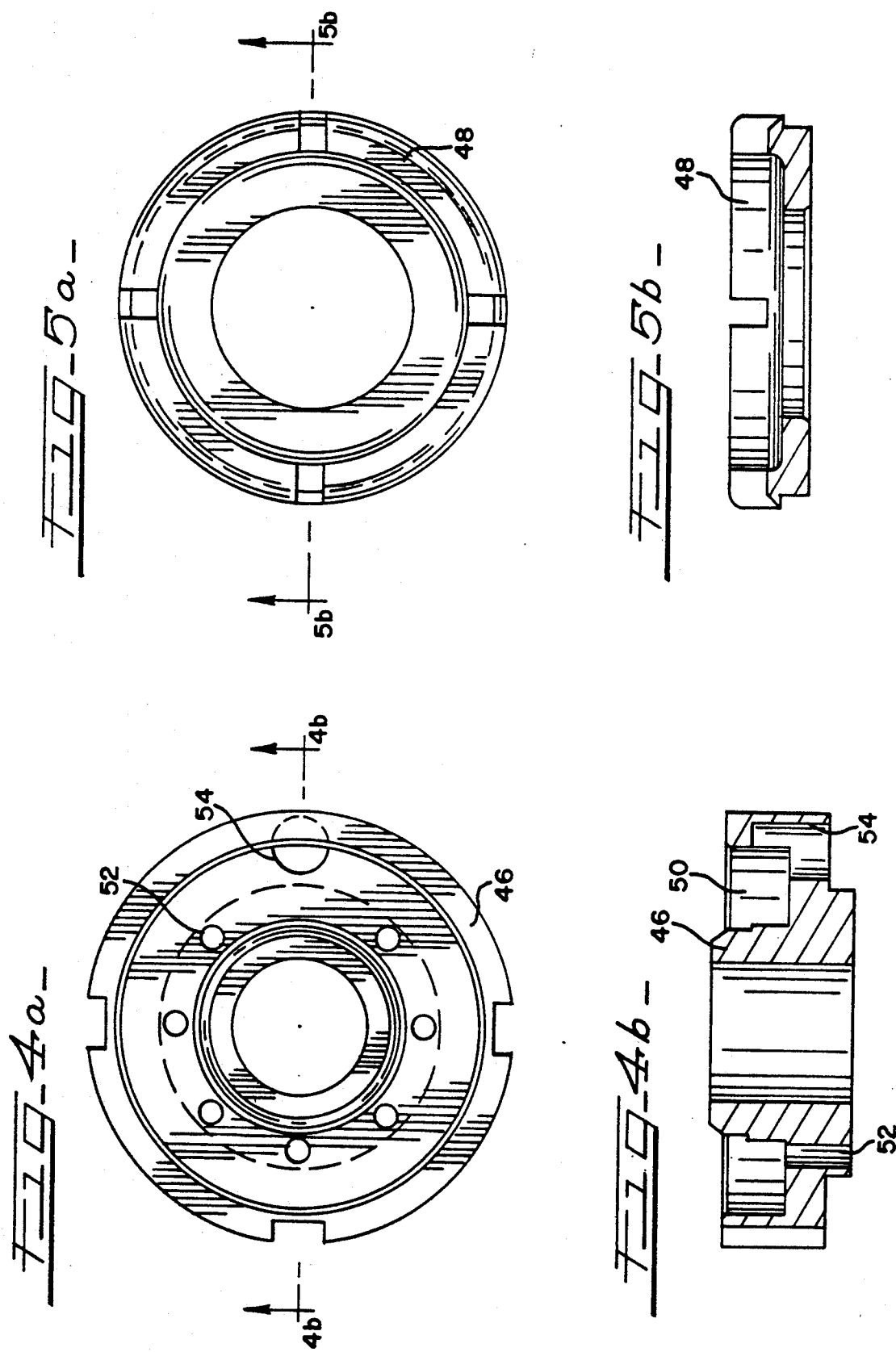

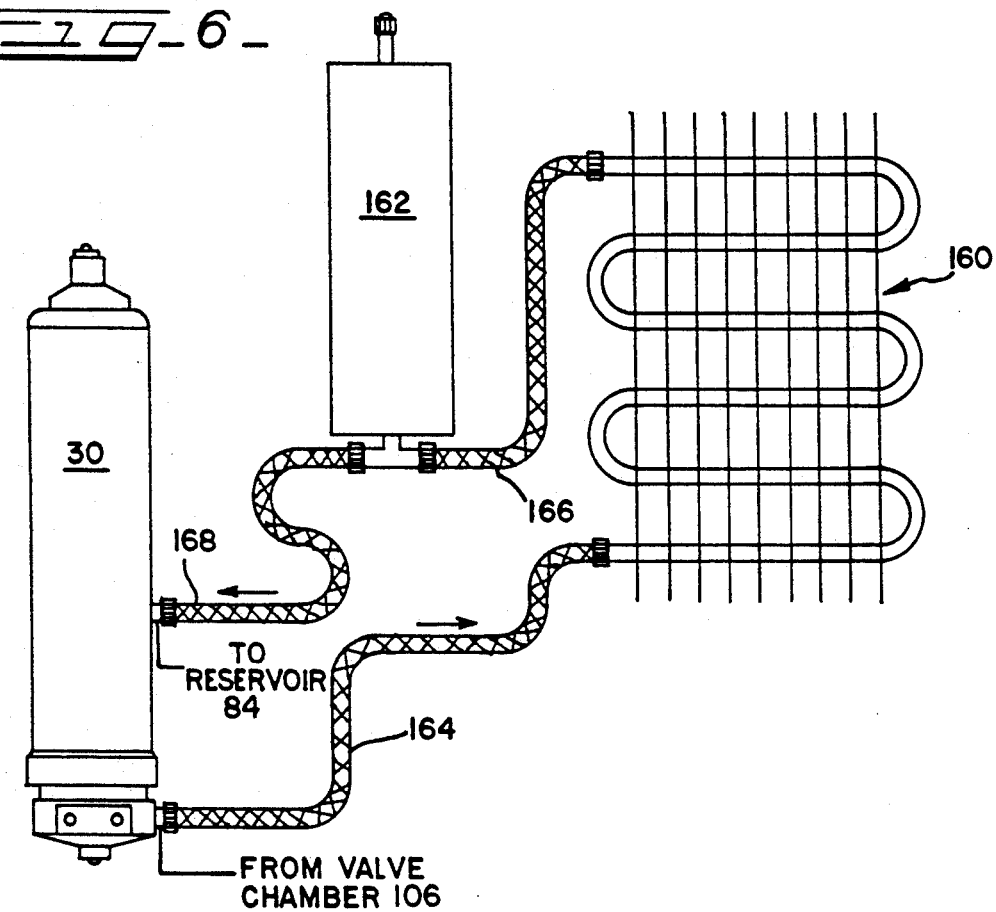
FIG-6-
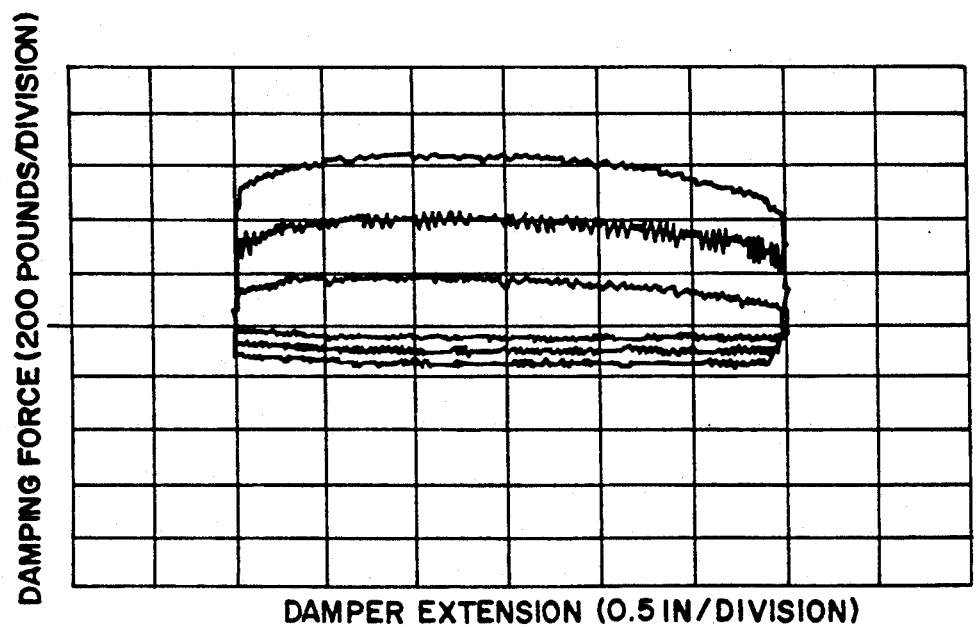
FIG-7-

FIG-8-
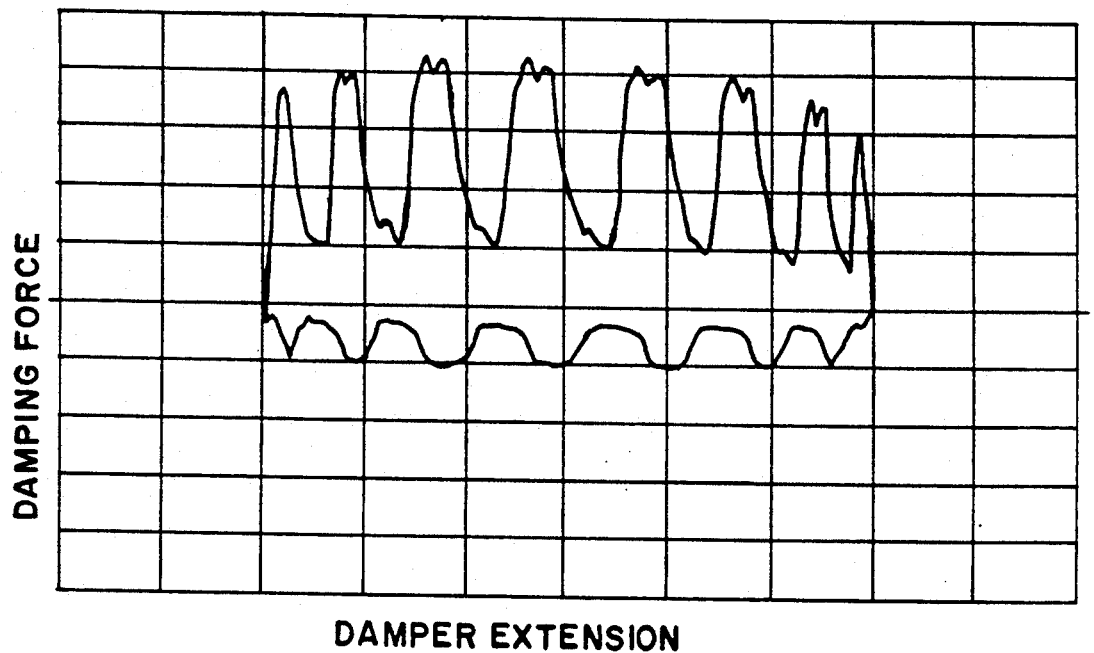
DAMPER EXTENSION
FIG-9-
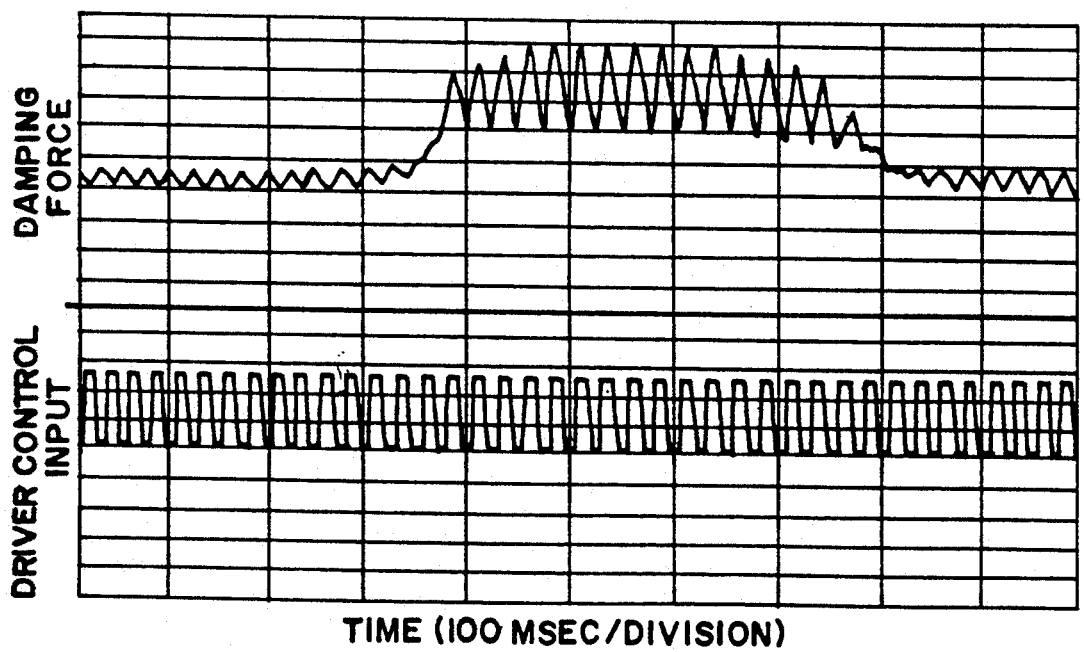
TIME (100 MSEC/DIVISION)

SHOCK ABSORBER WITH HEAT EXCHANGER AND IMPROVED CYLINDER HEAD ASSEMBLY

This is a division, of application Ser. No. 07/580,755, filed Sep. 11, 1990 now U.S. Pat. No. 5,113,980.

BACKGROUND OF THE INVENTION

This invention relates to an adjustable hydraulic shock absorber and system which utilize a fluid powered actuator to adjust a damping characteristic of the shock absorber.

Our previous U.S. Pat. No. 4,838,394 discloses an adjustable shock absorber and system which utilize fluid powered actuators such as pistons to control damping characteristics of the shock absorber. The shock absorbers disclosed in the '394 patent use three different devices for energy dissipation: (1) a low speed bleed orifice defined by the tapered slot 96 and the valve plate 92; (2) a spring loaded blow off valve comprising the valve plate 92 and the spring 100; and (3) a high speed restriction comprising the fixed restricting orifice defined by the plate 88. The low speed bleed orifice is integrated with the blow off valve, and the maximum pressure drop across the low speed bleed orifice is limited to the pressure at which the blow off valve opens. The high speed restriction provided by the plate 88 is in series with the blow off valve and is therefore always operative; however, its contribution to energy dissipation is negligible at low speeds.

The resulting damping forces provided by these three devices are shown in FIGS. 7 and 8 of the '394 patent. The steep rise at low speeds is attributable to the low speed bleed orifice, the knee of the curve is attributable to lifting of the blow off valve, and the increase in damping force with piston speed for piston speeds higher than the knee of the curve is attributable to the high speed restriction. Of course, there is also a constant dry friction force that is generally minimized in good designs because it produces a harsh ride.

At low speeds, the total damping force is the sum of friction, low speed bleed orifice forces and high speed restriction forces. After blow off, it is the sum of friction, blow off forces and high speed restriction forces.

In the system illustrated in the '394 patent all four shock absorbers are controlled by a single static pressure source 26 (arbitrarily defined as one having full scale variations in control pressure with a frequency no greater than one second). Alternately, as discussed in column 9, two separate control systems can be provided, each with its own pressure source to allow the driver to control the front and rear shock absorbers independently of one another. The '394 patent also suggests that the adjustable pressure reducing valve can be controlled by an automatic control system to prevent a vehicle from diving on deceleration or squatting on acceleration. Such a system would require a response time of about 300 ms.

Another approach to adjustable shock absorber design is to add a parallel bleed orifice that it is always effective. If this parallel bleed orifice is made variable, the damping force can be made variable. In general, the larger the parallel orifice, the lower the damping force.

Many prior art dampers, including adjustable dampers, use these three basic mechanisms. Many adjustable dampers use an electric motor or a solenoid powered valve to open a parallel orifice to the main damper valve. The '394 patent adjusts both the orifice and the blow off points, to get greater variation than that obtained merely by changing parallel orifice sizes, but the '394 patent design still uses the basic three stage valving technique. One disadvantage to this approach is that the damping force remains a function of the piston velocity of the damper. This function can be varied in adjustable dampers, but for a given setting of the adjustment the damping force still increases when piston velocity increases.

"A novel valve for semi-active vehicle suspension systems" by G. A. Parker, et al. (1988) discloses a damper system that uses an electrical feedback system to control damping pressure and therefore damping force. An electromagnetic valve at the damper modulates the damping pressure of the working hydraulic fluid in response to electrical control signals. This approach differs significantly from that of the '394 patent in that there is no hydraulic control circuit and no fluid powered actuator that adjusts the damping characteristics of the damper.

It is an object of this invention to provide an adjustable damper that utilizes a fluid powered actuator responsive to fluid pressure in a control circuit, which is higher in response speed than the system disclosed in the '394 patent, and is well suited for use in active damping systems.

SUMMARY OF THE INVENTION

This invention represents an improvement to shock absorbers of the type having a cylinder, a piston disposed in the cylinder to define first and second chambers on opposite sides thereof, and at least one passage interconnecting the first and second chambers such that movement of the piston in the cylinder in a selected direction forces a working hydraulic fluid from the first chamber through the passage in a selected direction.

According to a first aspect of this invention, a substantially constant pressure valve such as a blow off valve is disposed in the passage and is effective to restrict fluid flow through the passage to determine a damping characteristic of the shock absorber. A fluid powered actuator, responsive to fluid pressure in a control circuit, is coupled to the blow off valve by a substantially non-compliant link, such that forces applied to the fluid powered actuator by the control fluid in the control circuit are applied to the substantially constant pressure valve by the link, thereby adjusting pressure of the working hydraulic fluid behind the valve and the damping characteristic of the shock absorber. Preferably, a high speed pressure controlling device is used to modulate fluid pressure in the control circuit with a maximum response frequency of at least about 8 Hz, thereby accomplishing high speed adjustment of the damping characteristic of the shock absorber.

According to a second aspect of this invention, a shock absorber of the type described initially above is provided with a fluid powered pressure regulator which is coupled to the passage to control fluid pressure in the passage and therefor in the first chamber in response to fluid pressure in a control circuit, such that fluid pressure in the passage varies substantially less with variations in speed of the piston above a threshold speed than it does with variations in fluid pressure in the control circuit. Preferably, a high speed pressure controlling device of the type described above is used to modulate fluid pressure in the control circuit to provide high speed adjustment of the controlled fluid pressure in the passage.

According to a third aspect of this invention, a monoflow shock absorber of the general type described initially above is provided with additional passages arranged such that movement of the piston in the cylinder in either direction pumps the working hydraulic fluid from the first chamber through a first passage in a first direction. A heat exchanger is positioned in the first passage, spaced from the shock absorber, to cool the working hydraulic fluid pumped through the heat exchanger in the first direction by both extension and compression of the shock absorber. Preferably, this heat exchanger is positioned downstream of a flow restricting valve disposed in the first passage to control a damping characteristic of the shock absorber. This third aspect of the invention is not limited to active dampers of the type described below, but can also be employed to improve the heat rejection characteristics of other types of monoflow dampers, such as those shown in our above-identified U.S. Pat. No. 4,838,394.

According to a fourth aspect of this invention, a cylinder head assembly is provided for a monoflow shock absorber of the type described above, mounted to the cylinder to seal one end thereof. This assembly includes a body and a cap which are manufactured as at least two separate pieces and are assembled to form the cylinder head assembly. The assembly defines a manifold extending between the body and the cap, a plurality of first apertures in the body positioned to allow fluid flow from the cylinder into the manifold, and a second aperture in fluid communication both with the manifold and the first passage. Preferably, the second aperture is formed in the body, and the manifold is defined by an annular recess in the body. This fourth aspect of the invention is also not restricted to use with active dampers of the type described below, but can also be used to reduce manufacturing costs of other types of monoflow dampers.

The first two aspects of the invention described above provide an active damper or damping system which can readily be modulated at high frequencies so as to vary the damping characteristics of the damper during its stroke. This desirable result is achieved with a simple, low cost, rugged design that is readily adapted to a wide range of dampers including struts and air assists, and which can be used with a wide variety of vehicles. The active damper described below provides a wide range of adjustability, and the damping characteristic can be continuously adjusted if desired. The damper is easy to control with conventional electrical inputs, and the high speed pressure regulating device can be a small, relatively inexpensive servo valve having small power requirements.

The heat exchanger of this invention cooperates in an important way with the fluid flow characteristics of a monoflow damper. Since a monoflow damper pumps the working hydraulic fluid in the same direction during both damper extension and compression, a monoflow damper is optimally suited to pump the working fluid through a heat exchanger positioned separately from the shock absorber.

The improved cylinder head assembly of this invention is well suited to low cost, high volume manufacturing, and it minimizes the number of secondary machining operations required to complete the assembly. These advantages are obtained while enhancing the fluid flow characteristics of the cylinder head assembly as compared with comparably priced prior art designs.

The invention itself, together with further objects and attendant advantages, will best be understood by reference to the following detailed description, taken in conjunction with the accompanying drawings.

BRIEF DESCRIPTION OF THE DRAWINGS

FIG. 1 is a block diagram of an active damping system for a vehicle which incorporates a presently preferred embodiment of this invention.

FIG. 2 is a longitudinal sectional view of a shock absorber suitable for use in the system of FIG. 1.

FIG. 3 is a cross-sectional view taken along line 3—3 of FIG. 2.

FIG. 4A is a top view of the inner cylinder head body of FIG. 2.

FIG. 4B is a cross-sectional view taken along line 4B—4B of FIG. 4A.

FIG. 5A is a top view of the inner cylinder head cap of FIG. 2.

FIG. 5B is a cross-sectional view taken along line 5B—5B of FIG. 5A.

FIG. 6 is a schematic representation of a second preferred embodiment of this invention which incorporates a heat exchanger and an external pressurized reservoir.

FIGS. 7, 8, and 9 are graphs illustrating the damping characteristics of a shock absorber similar to that of FIG. 2.

DETAILED DESCRIPTION OF THE PRESENTLY PREFERRED EMBODIMENTS

Turning now to the drawings, FIG. 1 shows a block diagram of an active damping system 10 which incorporates a presently preferred embodiment of this invention. In this system an electronic computing unit 12 receives a variety of input signals such as feedback input signals from vertical acceleration sensors 14 and feed forward input signals from brake, steering and throttle sensors 16. The electronic computing unit 12 selects a desired damping force for each of four dampers or shock absorbers on a vehicle and supplies an electrical control signal to a servo valve driver 18 for each of the dampers. The servo valve driver 18 acts as an electrical interface between the electronic computing unit 12 and a low pressure servo valve 20, applying an electrical control signal to the low pressure servo valve 20 indicative of the desired damping force from the respective damper.

Each servo valve 20 is included in a control hydraulic circuit, and is interposed between a source of pressurized control fluid such as a power steering pump 22 and the respective damper. The servo valve 20 is connected to the pump 22 by pressure and return lines, and it is connected to the respective damper by a control line. The servo valve 20 responds to the electrical control signal supplied by the driver 18 to adjust the pressure of the control fluid applied to the damper between the limits defined by the pressure and return lines.

In order to achieve the full advantages of active damping, the servo valve 20 should operate as a high speed pressure control device with a maximum response frequency no less than about 8 Hz. A maximum response frequency of 8 Hz results in a mean to peak adjustment time of about 30 msec (one quarter of the period), which is an order of magnitude higher than the mean to peak adjustment time needed to control squat and dive of a vehicle body during acceleration and braking. Simply by way of example, the pressure and return lines may be pressurized to 300 and 0 psi respectively, and the servo valve 20 may modulate the pressure in the control line between 0 and 300 psi with a response frequency greater than 8 Hz. FIG. 1 does not show the drivers and servo valves associated with the remaining dampers of this suspension system.

FIG. 2 shows a longitudinal sectional view of one of the dampers 30 controlled by the servo valve 20. The damper 30 is a monoflow design having damping characteristics controlled by hydraulic pressure in the control line, and is in some ways similar to the damper shown in our U.S. Pat. No. 4,838,394. However, the damping characteristics and the fluid powered actuator of the damper 30 have been optimized for high frequency response such that the damper 30 is suitable for use in an active damping system.

As shown in FIG. 2, the damper 30 includes a base 32 which supports an outer reservoir cylinder 34, a down tube 36 and a foot 38. The foot 38 in turn supports an inner cylinder 40 which is disposed within and concentric to the outer reservoir cylinder 34. A reservoir cylinder head 42 is fixedly secured as for example by resistance welding to an upper portion of the reservoir cylinder 34, and an inner cylinder head assembly 44 closes off the upper end of the inner cylinder 40.

The inner cylinder head assembly 44 is made up of a body 46 and a cap 48, shown in detail in FIGS. 4A, 4B, 5A and 5B. The body 46 defines an annular recess 50 which communicates with the interior of the inner cylinder 40 by means an array of openings 52. Additionally, the body 46 defines a further opening 54 which receives an upper portion of the down tube 36, and interconnects the down tube 36 with the annular recess 50. The cap 48 closes off the annular recess 50 to form an annular manifold 56 that interconnects the openings 52 and the further opening 54.

The two-piece inner cylinder head assembly 44 provides particularly efficient flow characteristics, while minimizing the number of secondary machining operations. The body 46 and the cap 48 can be made by casting or molding processes to reduce manufacturing costs and can then be pressed or bonded together to form the inner cylinder head assembly 44.

A piston 58 is disposed in the inner cylinder 40, and is securely mounted to a piston rod 60 by a threaded nut 62. A piston stop 64 is interposed between the piston rod 60 and the piston 58, and the piston stop 64 forms a reaction surface for a bypass spring 66 that biases a bypass valve plate 68 to a closed position, against an upper face of the piston 58. The piston 58 defines an array of openings 70 which extend across the piston 58. The bypass spring 66 and the bypass valve plate 68 cooperate to form a check valve which prevents fluid flow downwardly (as shown in FIG. 2). The piston rod 60 passes through the inner cylinder head assembly 44 and the reservoir cylinder head 42 out of the damper 30. A rod seal 72 is positioned to prevent leakage of the working hydraulic fluid, and this rod seal 72 is held in position by a rod seal retainer 74 and a backup spring 76.

The foot 38 defines a central aperture which is selectively sealed by a replenishing valve 78. The replenishing valve 78 is mounted for axial movement in the inner cylinder 40 by means of a spring 80 and a retainer 82. The replenishing valve 78 acts as a check valve substantially preventing flow of the working hydraulic fluid downwardly, out of the inner cylinder 40, while allowing substantially unrestricted flow of fluid into the inner cylinder 40.

The region between the reservoir cylinder 34 and the inner cylinder 40 forms a reservoir 84 which is in fluid communication by a passage 86 with the region 88 in which the spring 80 is mounted. The following discussion of FIG. 3 will define in detail the adjustable valve located in the base 32 of the damper 30. At this point, it is sufficient to note that the piston 58 divides the region within the inner cylinder 40 into first and second chambers 90, 92 situated above and below the piston 58 (as shown in FIG. 2). On extension of the damper 30 the piston 58 moves upwardly as shown in FIG. 2 and the working hydraulic fluid in the inner cylinder 40 is prevented from moving across the piston 58. The working hydraulic fluid in the annular region around the piston rod 60 is pumped through the openings 52, the manifold 56, and the further opening 54 into the down tube 36. This fluid flows downwardly (as shown in FIG. 2) into the base 32, where an adjustable flow restriction is provided to control the damping characteristics of the damper 30. After passing through the restriction described below in conjunction with FIG. 3, the fluid then passes into the region 88, from which it can enter the second chamber 92 via the now opened replenishing valve 78, or the reservoir 84.

On compression of the damper 30 the piston 58 is moved downwardly (as shown in FIG. 2), thereby opening the bypass valve plate 68 and closing the replenishing valve 78. The volume of the piston rod 60 displaces working hydraulic fluid, and the rod displacement volume is passed through the openings 52, the manifold 56, and the further opening 54 into the down tube 36, into the base 32. Thus, the damper 30 pumps the working hydraulic fluid downwardly (as shown in FIG. 2) through the down tube 36 on both compression and extension of the damper 30.

Turning now to FIG. 3, the base 32 of the damper includes an adjustable flow restriction that is controlled by a fluid powered actuator. As shown in FIG. 3, the base 32 defines a down tube chamber 100 which is in unrestricted fluid communication with the down tube 36 of FIG. 2. Note in particular that the conventional high speed restriction orifice has been eliminated. The down tube chamber 100 communicates via a substantially constant pressure valve such as a blow off valve 102 having a valve plate 104 with a valve chamber 106. The valve chamber 106 is in unrestricted fluid communication with the region 88 of FIG. 2 and thereby with the reservoir 84 and the second chamber 92 (when the replenishing valve 78 is open). Thus, the blow off valve 102 forms the only significant flow restriction of the damper 30 during both compression and extension of the piston 58.

The valve plate 104 is biased to the closed position shown in FIG. 3 by a valve pin 108 that is guided in axial motion by a first guide assembly 110. The first guide assembly 110 includes an inner O-ring 112 which provides a sliding seal against the valve pin 108, and an outer O-ring 114, which provides a static seal against the sidewall 116 of a bore formed in the base 32. The inner O-ring 112 is held in position by a retainer plate 118 which is staked in position. The first guide assembly 110 is held in position by a first sleeve assembly 120 which is sealed in place by O-rings 122 in the bore of the base 32. The first sleeve assembly 120 defines a control cylinder 123 which supports a control piston 124 for limited axial movement. The valve pin 108 is fixed in place in the control piston 124 and provides a noncompliant, solid rod interconnecting the control piston 124 with the valve plate 104.

The volume between the control piston 124 and the first guide assembly 110 is vented to atmosphere via a vent port 126, an annular groove 128, and an opening 130 in the first sleeve assembly 120. The opposite side of the control piston 124 is in unrestricted fluid communication via holes 125 with a control pressure port 132, which receives pressurized control fluid directly from the servo valve 20 described above.

During normal operation the servo valve 20 provides a selected pressure on the control fluid introduced to the control pressure port 132, and this pressure creates a force on the control piston 124 which is directly transmitted through the noncompliant valve pin 108 to the valve plate 104. This controlled force on the valve plate 104 causes the blow off valve 102 to operate as a high speed pressure regulator, regulating the controlled pressure of working hydraulic fluid in the down tube 36. In this way, the electronic computing unit 12 can quickly select the desired damping force by controlling the servo valve 20 to apply the desired biasing force on the valve plate 104. Because the blow off valve 102 is the only significant flow restriction for working hydraulic fluid as it moves between the first and second chambers 90, 92, the damping force provided by the damper 30 is a strong function of the biasing force supplied to the valve plate 104, but is substantially independent of the speed of the piston 58. For this reason, the ECU 12 can select the desired damping force from the damper 30 quickly, reliably, and substantially independently of the speed of the piston 58. This feature of the damper 30 and the system 10 allows precise, high speed control of the damping force supplied by the damper 30.

The damper 30 also includes a backup system for insuring that the damper 30 provides a pre-selected damping force in the event of a failure of the servo valve 20 or the pump 22. This backup system is shown on the left-hand side of FIG. 3 and includes a second guide assembly 134 which defines a central aperture 136 and a bleed aperture 138. This second guide assembly 134 is held in position by a second sleeve assembly 140 which defines a second control cylinder 142. A second control piston 144 is arranged to slide within the second control cylinder 142, and is biased to the right (as shown in FIG. 3) by a spring 146. A protrusion on the second control piston 144 acts as a pilot diameter for the spring 146 as well as a compression stop. A rod 148 is fixed in position to the second control piston 144 and passes through the central aperture 136. The rod 148 defines a smaller diameter portion 150 nearer the piston 144, and a larger diameter portion 152 nearer the first control piston 124. The portion of the second control cylinder 142 which receives the spring 146 is vented to atmosphere via a vent port 154. The second sleeve assembly 140 is held in position by a cap 156 which is secured to the base 32 by capscrews.

During normal operation, when the control pressure at the control pressure port 132 is modulated by the servo valve 20, the control pressure is transmitted via the central aperture 136 and the bleed aperture 138 into the second control cylinder 142, where it moves the second control piston 144 to the left (as shown in FIG. 3), thereby compressing the spring 146. In this way, the rod 148 is removed from the first control piston 124, to allow the damper 30 to function as described above.

However, in the event control pressure at the control pressure port 132 falls below a selected value for an extended period of time, fluid will pass through the bleed aperture 138 to allow the second control piston 144 to move to the right (as shown in FIG. 3) until the rod 148 contacts the first control piston 124. At this point the spring force supplied by the spring 146 is applied by the rod 148 to the control piston 124 to provide a preselected force biasing the valve plate 104 closed. The smaller diameter portion 150 of the rod 148 provides an annular passage between the rod 148 and the second guide assembly 134 to allow lifting of the valve plate 104 during operation of the damper.

FIG. 6 shows an alternate embodiment of this invention, which is well suited to dissipate heat generated by the damper 30. The system shown in FIG. 6 includes a heat exchanger 160, which may be of the conventional finned type, and an external pressurized reservoir 162. The heat exchanger 160 is connected to the valve chamber 106 of FIG. 3 by a hose 164, and by a hose 166 to the reservoir 162. The reservoir 162 is connected by a hose 168 to the reservoir of the damper 30. Alternately, the hose 168 may be coupled to the base 32 to supply the working hydraulic fluid to the region 88 directly under the replenishing valve 78 (FIG. 2).

As pointed out above, the damper 30 is a monoflow design which pumps the working hydraulic fluid downwardly through the down tube 36 during both compression and extension of the damper 30. After this working hydraulic fluid has passed through the blow off valve 102 into the valve chamber 106 it is conducted by the hose 164 to the heat exchanger 160, by the hose 166 to the external pressurized reservoir 162, and then by the hose 168 back to the damper 30. Preferably the hoses 164, 166, 168, the heat exchanger 160 and the external pressurized reservoir 162 are all shaped and configured so as to provide no significant flow restriction. In this way, the blow-off valve 102 remains the primary flow restriction of the damper 30, and the heat exchanger 160 does not interfere with operation as described above. The external pressurized reservoir 162 may entirely eliminate the need for pressurized gas within the damper 30.

The external heat exchanger 160 shown in FIG. 6 provides important advantages over the prior art approaches of either building the shock absorber so that it can tolerate high temperature or simply increasing the surface area of the shock absorber available for heat dissipation. The cooperation between the pumping action of the monoflow shock absorber and the external heat exchanger provides particularly efficient heat rejection.

The system 10 and the damper 30 are well suited for an active suspension system. They provide high speed, inexpensive, rugged modulation of damping force, in a manner substantially independent of the stroking speed of the damper 30. The noncompliant link provided by the valve pin 108 minimizes the amount of control fluid passed by the servo valve 20, and there minimizes the size, cost and power requirements of the servo valve 20. Furthermore, the rigid coupling provided by the valve pin 108 is well suited to high speed response. The overall system provides the important advantage that the blow off pressure of the valve 102 depends almost entirely on the control pressure provided by the servo valve 20. This allows the electronic computing unit 12 to call for and obtain a specific damping force, substantially regardless of the stroking speed of the shock absorber. Preferably, a single driver 18 is dedicated to each of the dampers 30, to allow individual damper control during the stroke of the damper 30. The servo valve 20 can either be mounted directly on the damper 30 or chassis mounted in the immediate vicinity of the damper 30.

FIGS. 7 through 9 illustrate the manner in which the damping forces supplied by a damper similar to the damper 30 can be adjusted. FIG. 7 represents a conventional loop diagram which charts damping force on the Y axis and extension of the damper 30 on the X axis. In FIG. 7 each division on the Y axis represent 200 pounds, and each division on the X axis represent 0.5 inches. The sweep time was 0.87 seconds. Thus, in FIG. 7 a damper similar to the damper 30 was stroked with an amplitude of 3 inches at a frequency of 69 cycles per minute. The control pressure supplied to the control pressure port 132 was modulated at three discrete values, producing the three discrete loop charts of FIG. 7. Note that within each loop the damping force is substantially independent of stroking speed above a threshold speed, yet it varies greatly with variations in control pressure.

FIG. 8 shows a loop chart similar to that of FIG. 7, in which the control pressure was modulated at 20 Hz using a square wave. Note that the damping force is modulated repeatedly during each stroke. FIG. 8 clearly demonstrates that the system 10 can provide a damping force that decreases as the stroking speed increases. This result is the opposite of that obtained with many conventional dampers.

FIG. 9 shows a chart in which the X axis corresponds to time, with each division of the X axis equal to 100 milliseconds. The lower curve represents the control input to the driver 18, which is a 40 Hz square wave. The upper curve represents damping force for a damper similar to the damper 30 stroked at a frequency of 69 cycles per minute with a 3 inch amplitude. Note that the damping force is modulated at 40 Hz. In the system used to generate the curves of FIG. 9 the current to the servo valve was varied between 0 and 100 mA, resulting in a variation in control pressure between 10 and 200 psi. FIG. 9 by no means represents the optimum performance achievable with this invention, and further improvements in response time can be easily obtained.

Simply by way of example, in this embodiment the servo valve 20 can be of the type distributed by Holley Automotive Division of Colt Industries, Inc. as their Variable Force Solenoid Regulator, and the servo valve driver 18 can be of the type distributed by Datatran Labs, Inc. as model PWM. Alternately, the driver 18 and the servo valve 20 can be obtained from HSC Controls, Inc. as model 58C. Servo valves 20 provide the advantage of continuous modulation of the control pressure. However, in some alternate embodiments it may be preferable to use solenoid valves having a plurality of discrete control pressures. Alternately, a fast acting pump may be used as the high speed pressure controlling device, thereby eliminating the need for a pressure modulating valve separate from the pump. Because various portions of the base 32 are vented, it is preferable to use corrosion resistant materials such as stainless steel for elements such as the spring 146. Preferably, the body 46 and the cap 48 of the inner cylinder head assembly 44 are made of a material such as sintered iron having a minimum density of at least 6.1 grams per cubic centimeter with a 125 microfinish surface. The rod bore of the body 46 should preferably be burnished to size leaving an 8 micro finish surface. The cap 48 may be secured to the body 46 using an adhesive such as Loctite (TM) 620. The free end of the piston rod 60 and the base 32 are configured to be installed in the suspension system of a vehicle such as a car or truck.

The pressure input to the servo valve 20 can be supplied by a variety of pumps. A dedicated pump can be used instead of the power steering pump 22. Alternately, as described in our U.S. Pat. No. 4,838,394, hydraulic pressure can be tapped from the damper 30 to charge an accumulator which in turn feeds the servo valve 20.

From the foregoing, it should be apparent that an improved damping system and damper have been described which are well suited to the high speed response required for active dampers, which are reliable, rugged and relatively inexpensive to manufacture, and which, if necessary, can be connected to an external heat exchanger for improved heat rejection.

Of course, it should be understood that a wide range of changes and modifications can be made to the preferred embodiments described above. For example, the improved heat rejection techniques of this invention and the improved inner cylinder head assembly can be used on a wide variety of monoflow shock absorbers, including nonadjustable monoflow shock absorbers. Other types of fluid powered actuators such as diaphragms and bellows can be used instead of the control piston described above. Similarly, other types of constant pressure valves such as ball and seat valves can be substituted for the blow off valve 102. Furthermore, details of construction can be modified as desired to suit specific applications and specific fabrication techniques. It is therefore intended that the foregoing detailed description be regarded as illustrative rather than limiting, and that it be understood that it is the following claims, including all equivalents, which are intended to define the scope of this invention.

We claim:

1. In a vehicle shock absorber of the type comprising: a cylinder, a piston disposed in the cylinder to define first and second chambers on opposite sides thereof, a reservoir, a plurality of passages including a first passage interconnecting the first chamber with the reservoir and the second chamber, said passages arranged such that movement of the piston in the cylinder in both directions pumps a working hydraulic fluid from the first chamber through the first passage in a single first direction to at least one of the second chamber and the reservoir; and a flow restricting valve disposed in the first passage to control a damping characteristic of the shock absorber, the improvement comprising:
   a heat exchanger disposed in the first passage downstream of the first chamber and the flow restricting valve, and upstream of the second chamber and the reservoir with respect to the first direction to cool a working hydraulic fluid pumped through the heat exchanger in the same first direction by both extension and compression of the shock absorber such that flow through the heat exchanger is substantially unidirectional.

2. The invention of claim 1 wherein substantially all of the working hydraulic fluid pumped out of the first chamber passes through the first passage and the flow restricting valve.

3. The invention of claim 1 wherein the heat exchanger is coupled to the shock absorber by at least one flexible hose, included in the first passage.

4. The invention of claim 1 further comprising a pressurized reservoir coupled to the first passage, spaced from the shock absorber.

5. The invention of claim 4 wherein the pressurized reservoir is coupled to the shock absorber by at least one flexible hose.

6. In a vehicle shock absorber of the type comprising: a cylinder, a piston disposed in the cylinder to define first and second chambers on opposite sides thereof, a plurality of passages including a first passage interconnecting the first and second chambers, said passages arranged such that movement of the piston in the cylinder in either direction pumps a working hydraulic fluid from the first chamber through the first passage in a first direction; and a flow restricting valve disposed in the first passage to control a damping characteristic of the shock absorber, the improvement comprising:

a cylinder head assembly mounted to the cylinder to seal one end thereof, said assembly comprising a body and a cap which are manufactured as at least two separate pieces and assembled to form the cylinder head assembly;

said assembly forming a manifold bounded at least in part by a first surface of the body and a second surface of the cap, a plurality of first apertures in the body positioned to allow fluid flow from the cylinder into the manifold, and a second aperture in fluid communication both with the manifold and the first passage.

7. The invention of claim 6 wherein the second aperture is formed in the body, and wherein the manifold is defined by an annular recess in the body.

8. The invention of claim 7 wherein the cap is adhesively bonded to the body.

* * * * *

UNITED STATES PATENT AND TRADEMARK OFFICE
CERTIFICATE OF CORRECTION

PATENT NO. : 5,220,983
DATED : June 22, 1993
INVENTOR(S) : Furrer et al.

It is certified that error appears in the above-indentified patent and that said Letters Patent is hereby corrected as shown below:

ON THE TITLE PAGE ITEMS [75] AND [56]

In the first column, at "Inventors:", please delete "Frederick" and substitute therefor --Fredrick--.

In the second column, line 8, under "OTHER PUBLICATIONS", please delete "*Poplar*" and substitute therefor --*Popular*--.

In column 10, line 27, please delete "piston" and substitute therefor --pistons--.

Signed and Sealed this

Seventeenth Day of May, 1994

Attest:

BRUCE LEHMAN

*Attesting Officer*    *Commissioner of Patents and Trademarks*